United States Patent [19]

Schroeder et al.

[11] Patent Number: 4,896,022
[45] Date of Patent: Jan. 23, 1990

[54] COFFEE POT HAVING A TEMPERATURE REGULATING BASE

[76] Inventors: Alfred A. Schroeder, 2711 Whisper Fawn, San Antonio, Tex. 78230; Lenord G. Ewing, 2305 Brittany Grace, New Braunfels, Tex. 78130

[21] Appl. No.: 246,630

[22] Filed: Sep. 20, 1988

[51] Int. Cl.⁴ .............................................. F24C 15/10
[52] U.S. Cl. .................................... 219/433; 219/521; 126/215
[58] Field of Search ............... 219/433, 432, 430, 521; 126/211, 212, 214 C, 214 D, 215, 221

[56] References Cited

U.S. PATENT DOCUMENTS

| 690,760 | 1/1902 | Oliver | 126/215 |
| 928,634 | 7/1909 | Cruickshank | 126/215 |
| 1,748,461 | 2/1930 | Picarelli | 126/215 |
| 1,864,715 | 6/1932 | Detweiler | 126/215 |

FOREIGN PATENT DOCUMENTS

| 1127095 | 12/1956 | France | 126/215 |
| 18355 | of 1911 | United Kingdom | 126/215 |
| 174476 | 2/1922 | United Kingdom | 126/215 |

Primary Examiner—Teresa J. Walberg
Attorney, Agent, or Firm—Cox & Smith Incorporated

[57] ABSTRACT

A base (or similar article) composed of a flexible material having a high melting point, which base is mounted on the lower surface of a plastic coffee pot (or other container) to appropriately regulate the increase in the temperature of the coffee pot in an ideal manner when the pot is placed on a standard heating plate.

13 Claims, 4 Drawing Sheets

COFFEE POT HAVING A TEMPERATURE REGULATING BASE

BACKGROUND OF THE INVENTION

The present invention relates to a means for regulating the transfer of heat to and from the surface of a container. More particularly, the present invention relates to a temperature regulating means adapted to mount on the lower surface of a liquid container, such as a coffee pot, for maintaining the temperature of the container within a suitable range regardless whether liquid is contained therein, said temperature regulating means utilizing a moving blanket of air relative to the lower surface of said container in order to regulate its temperature.

Containers which are used for containing coffee and other liquids during heating and temperature maintenance of the liquid must be able to withstand the thermal abuse to which they will be subjected. Such containers are typically made of glass and are heated by heating elements which provide a somewhat constant rate of heat generation without regard to the temperature of the container. In fact, virtually all commercially available heating plates intended for use with coffee pots have 100 Watt heating elements which have no temperature controls other than their main power switch. This arrangement may be relatively effective in common circumstances in which the container is periodically refilled with liquid since heat from the heating element is transferred to the container and subsequently conducted to the liquid. The liquid not only enables dissipation of the heat but even slightly refrigerates the container since the liquid is continuously subject to cooling due to evaporation at its upper surface.

However, such a heating arrangement is much less effective, and in fact becomes quite hazardous, when there is little or no liquid contained within the heated container. Such a situation results in a variety of instances and commonly occurs due to complete evaporation of the liquid within the container. Heat can only be conveyed from an empty container through means of convection or radiation of the heat between the container and the gaseous air that surrounds it, processes which are slower and less efficient than the mechanisms acting when the container is filled with liquid. The "hot spots" of standard heating elements are known to reach 450° F. Therefore, when a container is left empty on an activated heating element, its temperature tends to become excessive as well.

Furthermore, even when the temperatures do not reach extremely critical levels, the material of a coffee container is subject to harsh thermal changes. In most circumstances, a coffee container is continually being removed from its burner in order to pour a cup (allowing the container to cool) and then replaced back onto its heating element which has been increasing in temperature while the container was removed. Commonplace events like that subject a coffee container to harsh thermal changes which create internal stresses in its material.

As a result of excessive or rapidly changing temperatures and the internal stresses caused thereby, thermal cracking of the container may occur. Such cracking may, often without notice, cause the ultimate failure of a container which, especially with a hot pot of coffee, can lead to scalding and other injuries. Such cracking is especially likely when the container accidentally or otherwise strikes against another object or when it is suddenly quenched cooled such as when subjected to cold water.

Furthermore, it is particularly desirable to replace the conventional glass material of coffee containers with materials that are less costly, less likely to break, and more lightweight. Plastic materials present such benefits but their use is encumbered by a variety of other problems. To begin with, many plastics do not meet federal standards required for containing coffee. Many plastics are also vulnerable to the high temperatures encountered on conventional heating elements designed for heating coffee. In fact, of the plastics known which do meet the federal and industry standards, there is none which can withstand the temperatures that may be encountered on conventional heating elements. Not only are plastics more susceptible to melting than glass, but enduring high temperatures also tend to shorten its life otherwise. Plastics are subject to several failure mechanisms similar to those previously discussed in addition to softening and melting, and they may also become discolored due to oxidation or concentrated dislocations caused by thermal stress.

Many attempts have been made to provide plastic containers without much success. One such attempt is to bond epoxy or other high temperature materials directly to the bottom of a plastic carafe. As soon as the bonded material reaches the temperature of the warming plate, the plastic carafe deteriorates rapidly from causes such as blistering, cracking, heat distortion, heat crazing, etc. Short term exposure to a heating plate is alright for most conceivable plastic containers as long as the carafe is full of liquid, but after long use, even when filled with liquid, containers often fail. Worse, though, when a heated container is empty due to evaporation or other causes, it tends to fail more prematurely.

Other attempts have resulted in designs which tend to unnecessarily limit contact with a heating plate due to the shape of the carafe's bottom. Another attempt was to fabricate a carafe in two pieces, with the bottom section metal and the upper section being plastic, resulting in a seam on the inside of the carafe. Unfortunately, such seams are considered unsanitary and substantial amounts of heat are concentrated at the interface between metal and plastic, therefore causing premature failure.

It is therefore an object of the present invention to provide a temperature regulating element which regulates the transfer of heat to and from a container for containing liquid. It is also an object of the present invention to provide a means for heating a container to a desired temperature in a regulated manner by utilizing heat from a source of continuous heat production without damage to the container.

Another object of the present invention is to provide a means for maintaining the flavor of coffee warmed in a container on a standard heating element.

It is a further object of the invention to minimize the possibilities of stress cracking in the material of a container heated on a standard heating element.

Further, it is an object of the present invention to provide a temperature regulating means which is adapted to be mounted on the lower surface of a standard container for containing coffee or other liquids; and it is yet another object of the present invention to provide a container for containing heated liquids, which container is permanently secured to a means for insulating the base of said container.

SUMMARY OF THE INVENTION

Figure 1:
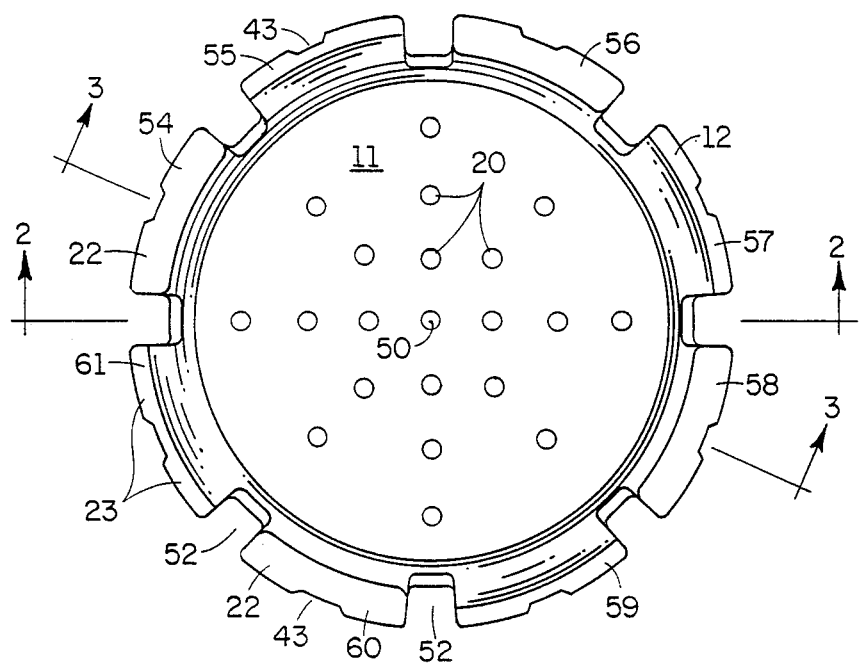
FIG. 1 shows a top view of the first embodiment of the temperature regulating base of the present invention.

The present invention provides an apparatus which is a temperature regulating base adapted to mount on the lower surface of a coffee pot or other liquid container to regulate the transfer of heat to that container from a heating plate upon which it rests. The present invention also provides a coffee pot having such a temperature regulating base mounted on its lower surface.

In each of four embodiments of the temperature regulating base, it comprises a substantially planar member integral with an annularly conical wall. The temperature regulating base is adapted for being positioned on a conventional heating plate beneath the lower surface of the carafe in a manner such that a heating space is formed beneath the planar member and a transfer space is enclosed between the planar member and the carafe. Each alternative embodiment comprises spacing means for enabling the allowance of open passageways between the atmosphere and the heating space. Those passageways enable provision of atmospheric air to a heating space in which the air is heated by convection above the heating plate. Still another alternative provides an insulating blanket of air with minimal surface contact between the insulating base and the bottom of the carafe. Several, if not all, of a plurality of holes through the planar member in each of the alternative embodiments allow for the flow of heated air from the heating space to the transfer space in which the heat is transferred from the air to the carafe adjacent thereto. Vents or other exhaust means are formed between the temperature regulating base and the carafe in order that the air within the transfer space can be exhausted therefrom as additional heated air flows upwardly from the holes in the planar member. Another alternative insulating base is comprised of wire (plastic or metal). Thus the temperature regulating base generally provides means for enabling circulatory flow between the atmosphere and the transfer space, particularly when the carafe and the temperature regulating base rest within the heating cavity of the heating base.

Furthermore, the combination of the various features of the alternative embodiments provide means for automatically regulating the overall heat transfer to the lower surface of the carafe by automatically causing the circulatory flow to increase as the carafe becomes warmer, thereby increasing the rate at which cool air is drawn from the atmosphere and also increasing the rate of convective cooling at the lower surface of the carafe. The alternative embodiments are provided with various combinations of spacing means, differently sized vents, different numbers and configurations of holes in the planar member, and slots. Each of those various combinations operate in basically similar but slightly different manners for regulating the temperature of the carafe.

Additionally, the particulars of the temperature regulating base provide for drainage of water from within the enclosed transfer space to enable the washing of the temperature regulating base as mounted on a carafe.

Many other features, advantages and alternatives are detailed in the following detailed description of the preferred embodiment and still others will be obvious to one of ordinary skill in the art in light of the figures, the discussions and descriptions of the present invention, and the appended claims. Such are known and intended to be within the scope of the present invention.

DETAILED DESCRIPTION

Figure 2:
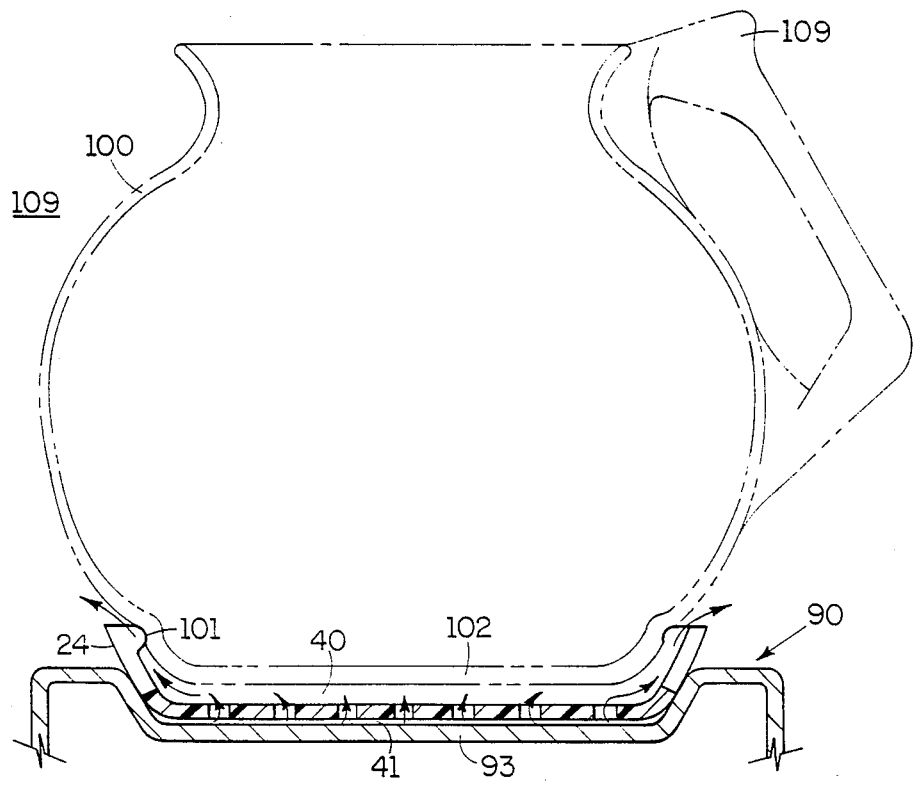
FIG. 2 shows a cross-sectional view of the temperature regulating base of FIG. 1 in operative relation with standard coffee pot 100 and heating plate 90.

FIG. 1 shows a top plan view of the first embodiment of the temperature regulating base 10 of the present invention. Temperature regulating base 10 is adapted to mount on the lower surface of carafe 100 or other container for regulating the temperature of said lower surface, which lower surface is subject to change due to heat from a heat source beneath the carafe. FIG. 2 shows a cross-sectional view of temperature regulating base 10 in operative relation with carafe 100 for regulating the temperature of the lower surface 102 of carafe 100 and for regulating heat transfer from heating plate 90 to carafe 100.

Figure 3A:
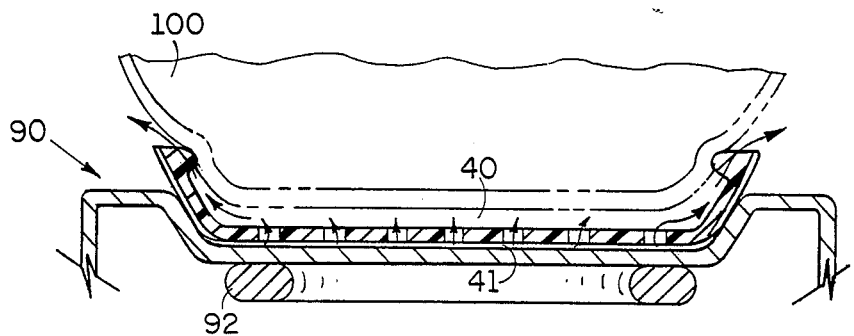
FIG. 3a shows a cross-sectional view of the first embodiment of the present invention as operatively employed on carafe 100 and heating plate 90, the cross-section being taken on plane 3—3 of FIG. 1.
Figure 3B:
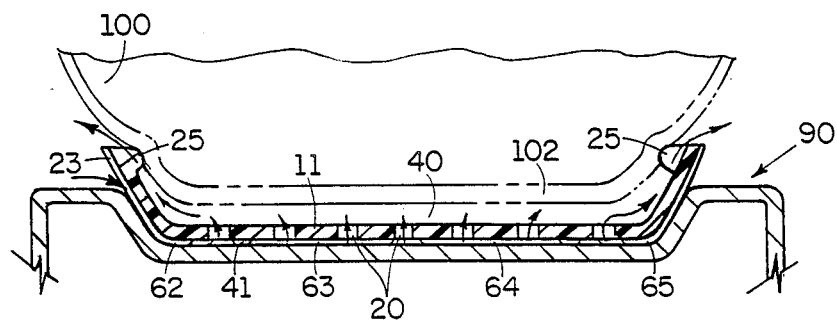
FIG. 3b shows a cross-sectional view of the second embodiment of the temperature regulating base of the present invention in operative relation with carafe 100 and heating plate 90, the cross-section being taken on a plane such as plane 3—3 of FIG. 1.
Figure 4:
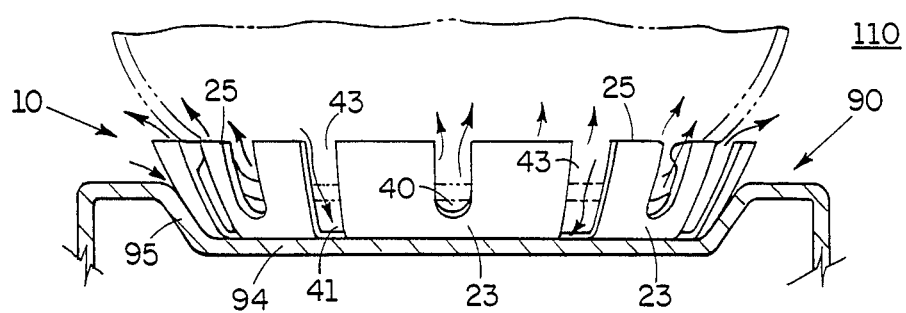
FIG. 4 shows an elevation view of the embodiment shown in FIG. 3b, with heating plate 90 being shown in central cross-section on plane 3—3 of FIG. 1.
Figure 5:
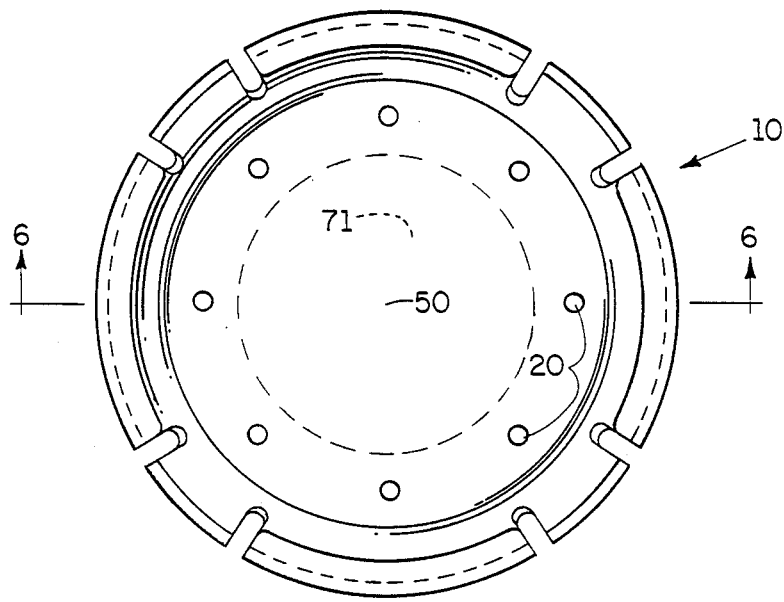
FIG. 5 shows a top view of the third embodiment of the temperature regulating base of the present invention.
Figure 6:
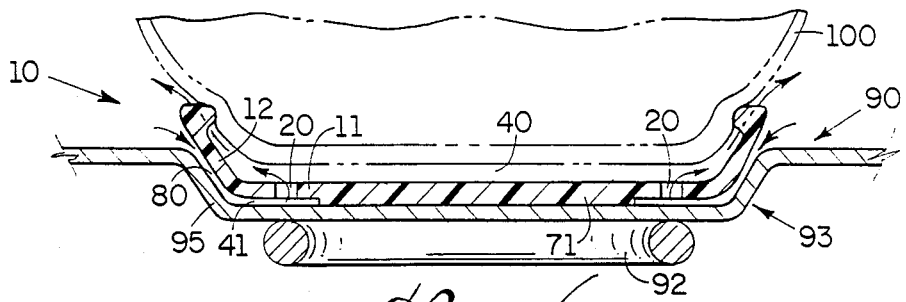
FIG. 6 shows a cross-sectional view of the temperature regulating base shown in FIG. 5, base 10 being operatively employed in relation with heating plate 90 and carafe 100.
Figure 7:
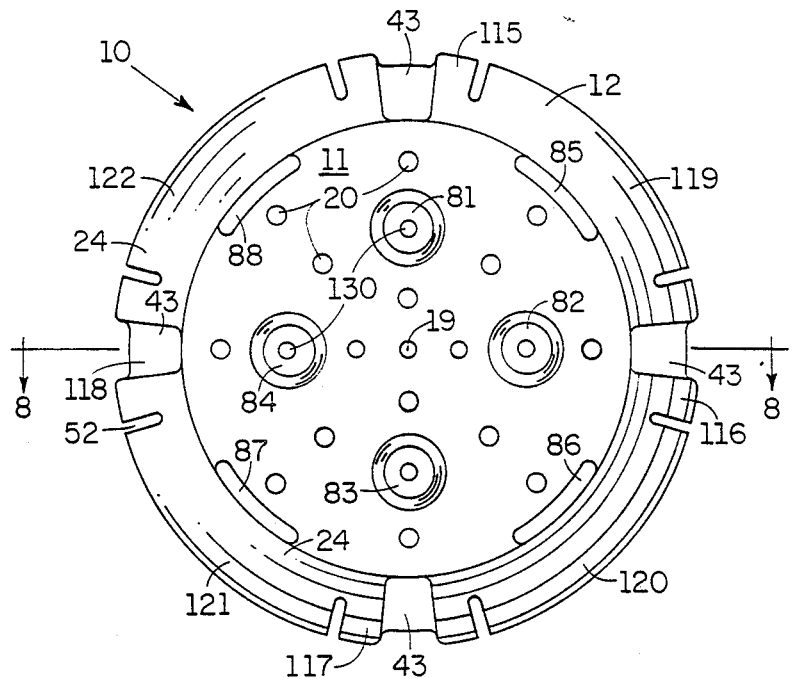
FIG. 7 shows a bottom view of the fourth embodiment of the temperature regulating base of the present invention.
Figure 8:
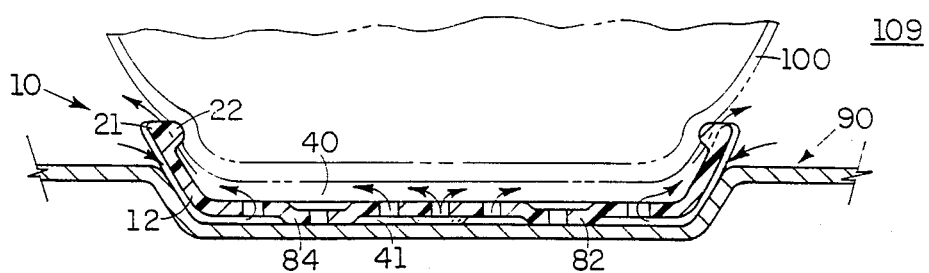
FIG. 8 shows a cross-sectional view of the embodiment shown in FIG. 7 as operatively employed in relation to carafe 100 and heating plate 90.

In all, four embodiments of temperature regulating base 10 are shown in FIGS. 1-8—the first embodiment being shown in FIGS. 1, 2 and 3a; the second embodiment being shown in FIGS. 3b and 4; the third embodiment being shown in FIGS. 5 and 6; and the fourth embodiment being shown in FIGS. 7 and 8. Those embodiments, each of which is alternative to the others, each have various features which are similar if not identical to features of the others of those embodiments and, accordingly, the reference numbers for most of those features correspond in each of the embodiments despite differences in their size, shape and relative arrangements. Unless otherwise noted or obvious, description of the advantages and other details of any one of such correspondingly numbered features is descriptive of each other one as well. The detailed distinctions between the various embodiments shown in FIGS. 1-8 will be obvious to one of ordinary skill in the art in light of FIGS. 1-8 as taken in conjunction with this description and the appended claims.

As is evident from FIG. 2, the temperature regulating base 10 is primarily designed for use in conjunction with heating plate 90 and carafe 100, although the design of the present invention is obviously adaptable to other heating elements and containers as well. Carafe 100 is a coffee container similar to a standard coffee pot and is adapted to be used as such, although carafe 100 is composed of a blow-molded plastic which meets federal standards for containing brewed coffee. Carafe 100 may be composed of any material which is approved by the U.S. Food and Drug Administration or the industry for containing coffee, tea or other consumable product. A handle 109 is provided for carafe 100. Carafe 100 also has a circumferential seat 101 formed therefrom, which is an adaptation including a groove for receiving the upper rim 21 of temperature regulating base 10.

Heating plate 90 is a standard heating plate having a circular cavity 91 of the smallest diameter commonly available in the art for heating coffee containers such as carafe 100. Circular cavity 91 is defined by a portion 93 (referred to as "cavity defining portion 93") of heating plate 90. Cavity defining portion 93 includes a conical portion 95 and a planar portion (not numbered). Cavity 91 is for receiving the base of a coffee container and receives temperature regulating base 10. Heating coil 92 is rigidly connected beneath cavity defining portion 93 as a heating element of heating plate 90. Heating coil 92 generates heat which is conducted from coil 92 to the cavity defining portion 93 of heating plate 90, which cavity defining portion 93 is composed of a metal or other suitable material for enabling conduction of heat from heating coil 92 to any object resting on cavity portion 93. Heating coil 92 is oriented in a circular path about the center of circular cavity 91 as is a standard configuration known in the art of heating plates. The upwardly facing surfaces of heating plate 90 are coated with a porcelain material as is also common in the art of heating plates.

The material of temperature regulating base 10 is capable of maintaining its integrity at temperatures above 450° F. for extended periods of time.

Temperature regulating base 10 comprises generally planar portion 11 and annular wall 12. Annular wall 12 is generally frusto-conical in shape and may have channels, vents or slots therein for enabling mounting of base 10 to carafe 100 and for enabling temperature regulation of carafe 100. Planar portion 11 is approximately planar and may have holes 20 therethrough or other modifications for enabling the structure and function of temperature regulating base 10. planar portion 11 and annular wall 12 are integrally connected to form an approximately cup-like shape having particular adaptations for mounting on the lower surfaces of carafe 100. Temperature regulating base 10 is also adapted to fit snugly within circular cavity 91 of heating plate 90.

Each of a plurality of protrusions 22 is a lip which protrudes inwardly from the uppermost portions of annular wall 12 for enabling mounting of base 10 to carafe 100. Protrusions 22 are a part of the upper rim 21 of temperature regulating base 10. Slots 52 in annular wall 12 enable mounting by enabling protrusions 22 to be outwardly flexed relative to the portions of rim 21 which do not have protrusions 22. Each of the portions of annular wall 12 which are partially segregated by slots 52 are referred to as "teeth"; for instance, the portions 54–61 of annular wall 12 which are substantially segregated from each other by slots 52 in FIG. 1 are teeth 54–61. In each of the embodiments of FIGS. 1–8, there are two types of teeth—a first type having protrusions 22 thereon and a second type allowing for vents 25 (discussed below). In FIG. 1, teeth 54, 56, 58 and 60 are of the first type and, teeth 55, 57, 59 and 61 are of the second type. Thus, any given tooth of teeth 54–61 is identical to every second one of teeth 54–61 in angular succession about central axis 50. Similar is true of each of the embodiments of FIGS. 1–8. Protrusions 22 of upper rim 21 engage the lower portions of carafe 100 and fit snugly within circumferential seat 101 to enable secure mounting of temperature regulating base 10 to the lower portions of carafe 100 in a snap-on fashion. Once temperature regulating base 10 is mounted on carafe 100 with protrusions 22 seated within circumferential seat 101, temperature regulating base 10 is permanently mounted on carafe 100. When permanently mounted on carafe 100, temperature regulating base 10 encloses transfer space 40 between temperature regulating base 10 and base 102. The spaces between angularly successive ones of protrusions 22 are vents 25 defined by upper rim 21 in conjunction with carafe 100 for enabling fluid communication between transfer space 40 and the atmosphere 110.

The planar portion 11 of temperature regulating base 10 is provided with a plurality of holes 20 therethrough. Holes 20 are spaced along one or more circular paths about the central axis 50 of base 10 (as is evident from each of FIGS. 1, 5 and 7) and may be spaced along radial axes (as is evident from FIGS. 1 and 7). In each of the embodiments shown in FIGS. 1–8, one of the circular paths, along which holes 20 are spaced, has the same diameter as heating coil 92. Each of holes 20 communicate with transfer space 40. Each particular hole 20 thus enables fluid communication between transfer space 40 and any space adjacent the lower surface of planar portion 11 at the location of the particular hole 20.

For further purposes of this description, various features of annular wall 12 are referred to as being "conically axial" in orientation. Such reference describes a feature as being symmetrical about an axis which is coplanar with central axis 50 of temperature regulating base 10 and which is concurrent with the conical shape of annular wall 12. In other words, any conically axial feature of annular wall 12 is symmetrical about an axis which intersects central axis 50 at the vertex of the conical shape of annular wall 12. Central axis 50 is, incidentally, perpendicular to the plane of FIG. 1. For the purposes of this description, the features of annular wall 12 described as being "axial" will include those features which are conically axial.

Referring specifically to the first embodiment of temperature regulating base 10 as shown in FIGS. 1, 2 and 3A, planar portion 11 is substantially uniform in its vertical thickness. Annular wall 12 has ridges 23, which are conically axial, on its outer surface 24 (numbered in FIG. 2). Annular wall 12 has a total of eight of ridges 23 formed in its outer surface 24, each of ridges 23 having a slot 52 therethrough. Slots 52 are spaced at equal arcs about central axis 50. Slots 52 are also conically axial and each of slots 52 is central to one of ridges 23. Eight channels 43 are defined between ridges 23, each channel 43 being defined between circumferentially successive ridges. Channels 43 are upwardly slanting channels in the outer surface of annular wall 12.

When ridges 23 are snugly fit within cavity defining portion 93 of heating plate 90, ridges 23 function as spacers providing a heating space 41 between planar member 11 and heating plate 90. Due to the diameter of planar member 11 being approximately the same as the diameter of the planar portion of cavity defining portion 93, engagement of ridges 23 with the conical portion 95 of heating plate 90 leaves heating space 41 formed beneath planar member 11 even though ridges 23 do not directly engage the planar portion of cavity defining portion 93. Ridges 23 also ensure free fluid communication between the atmosphere 109 and heating space 41, which fluid communication is through channels 43. Thus, the only contact between temperature regulating base 10 and heating plate 90 is made between ridges 23 and conical portion 95. Upper rim 21 of annular wall 12 has four protrusions 22 spaced at equal arcs about central axis 50 for mounting to the lower portion of carafe 100.

When temperature regulating base 10 rests within cavity 91, ridges 23 bear against the conical portion 95 of cavity defining portion 93 and air is able to continuously flow in a circulatory manner. Such continuous circulatory flow is from atmosphere 109, through channels 43, into heating space 41, through holes 20, into transfer space 40, and then out through vents 25 back to atmosphere 109. With such circulatory flow in effect, heat is not transferred directly from heating plate 90 to carafe 100, but rather it is conveyed to carafe 100 through the air flowing from heating space 41 to transfer space 40. Naturally, when heating plate 90 is heated, air circulating into heating space 41 is heated by cavity defining portion 93 and (because it reaches a lighter density when heated) rises upwardly through holes 20 and into transfer space 40. With heated air being supplied to transfer space 40 in the manner of the previous sentence, a blanket of moving, heated air is formed directly beneath carafe 100 and the base of carafe 100 is heated without reaching excessive temperatures. Similar blankets of heated air are formed by each of the alternative embodiments of the present invention and further surround carafe 100 as the heated air exits transfer space 40, flowing upwardly around carafe 100.

Further, as the temperature of carafe 100 is elevated, the temperature of air within transfer space 40 is also maintained at a higher temperature and therefore exhaust upwardly through vents 25 more rapidly than when the temperature of air within transfer space 40 is not as elevated Consequently, as air is more rapidly exhausted through vents 25, air from atmosphere 110 (which is cooler than that being exhausted through 25) is drawn more rapidly through channels 43. This increase in the rate of drawing cooler air from the atmosphere 110 causes regulation of the temperature within transfer space 40. Additionally, when air within transfer space 40 is of higher temperatures and exhaust more rapidly through vents 25, the circulation of air beneath carafe 100 is also more rapid in general; this increased circulation beneath carafe 100 tends to regulate the temperature increase of carafe 100 due to the natural cooling action of rapidly flowing air adjacent the lower surface 102 of carafe 100.

On the other hand, when temperature regulating base 10 of the first embodiment is removed from within cavity 91 and placed on a flat surface such as a tabletop (not shown), the lower surface of planar member 11 bears directly upon such flat surface and flow through holes 20 is thus prevented. Such prevention of flow through holes 20 minimizes cooling of carafe 100 when carafe 100 is removed from heating plate 90. Temperature regulating base 10, therefore, incorporates features for maintaining the temperature of carafe 100 when removed from heating plate 90.

Referring to FIGS. 3B and 4, there is shown the second embodiment of temperature regulating base 10 of the present invention. The second embodiment of temperature regulating base 10 is substantially identical to the first embodiment shown in FIGS. 1-3A except that each of ridges 23 not only continues over the full height of wall 12 (as in said first embodiment), but also extends slightly beneath planar portion 11. Therefore, extensions 62-65 of certain ones of ridges 23 are visible beneath planar portion 11 in FIG. 3B. Referring to the extension 62 as exemplary of the extensions of ridges 23 beneath planar portion 11, each of ridges 23 are smoothly rounded near their convergence with planar portion 11. Thus, in the second embodiment of temperature regulating base 10, ridges 23 function as spacers to provide heating space 41 by bearing against the planar section 94 of cavity defining portion 93 as well as the conical section 95 of cavity defining portion 93.

Each of the first, second, third and fourth embodiments of the temperature regulating base 10 enable circulatory flow from atmosphere 110, into a heating space 41, through holes 20, into a transfer space 40 and back to atmosphere 110 through a plurality of vents 25 defined between angularly successive ones of protrusions 22.

The circulatory flow enabled by the second embodiment of temperature regulating base 10 is virtually identical to that of the first embodiment shown in FIGS. 1-3A. Thus, air flows from atmosphere 110 into heating space 41 through channels 43. When in heating space 41, the air receives heat from heating plate 90 and eventually rises upwardly into transfer space 40 by way of holes 20 (shown in FIG. 3B) The air transfers heat from heating plate 90 to transfer space 40 by way of convection. The heat is then transferred from the air in transfer space 40 to carafe 100 as the air flows beneath base 102 and exhausts upwardly from transfer space 40 through vents 25. As the heated air rises above vents 25, it tends to flow closely adjacent to carafe 100 and the described cycle of circulation continues as cooler air is then drawn into channels 43 to replace the air exhausting through vents 25.

FIGS. 5-6 show the third embodiment of the temperature regulating base 10 of the present invention. The third embodiment does not have the ridges 23 which are characteristic of the first and second embodiment, but rather has a central spacer 71 for spacing it relative to cavity defining portion 93. Central spacer 71 is a circular feature protruding from the lower surface of planar member 11. Central spacer 71 functions to provide a heating space 41 beneath planar member 11. Rather than channels, such as channels 43 of the first and second embodiment, temperature regulating base 10 of the third embodiment has a diameter which is small enough to provide a conically shaped passage 80 between annular wall 12 and the conical section 95 of cavity defining portion 93.

Holes 20 are radially spaced about the central axis 50 of temperature regulating base 10 at a distance from central axis 50 which is equal to the mean radius of heating coil 92. Thus, because temperature regulating base 10 is generally circular in nature and therefore tends to be placed centrally within the cavity of heating plate 90, the features of the embodiment shown in FIGS. 5 and 6 tend to cause placement of temperature regulating base 10 with holes 20 directly above the circular path of heating coil 92. Such placement of holes 20 directly above heating coil 92 enhances the performance of temperature regulating base 10 by providing a direct path for the conveyance of heat from heating coil 92 to transfer space 40. Such direct path for conveyance is substantially more desirous than more rapid heat transfer by conductance through the material of temperature regulating base 10. Certain ones of the holes 20 of the first, second and fourth embodiment of temperature regulating base 10 similarly tend to be positioned directly above the circular path of heating coil 92.

The fourth embodiment of the temperature regulating base 10 of the present invention is shown in FIGS. 7 and 8. The fourth embodiment incorporates various features of the first, second and third, previously described embodiments of temperature regulating base 10 as well as others. Of particular distinction are recessed spacers 81-84 and ridges 85-88. Each of ridges 85-88 and recessed spacers 81-84 are formed from and integral with planar member 11. Ridges 85-88 protrude downwardly from along the periphery of planar member 11. Ridges 85-88 provide stability by spacing the periphery of planar member 11 above a surface when temperature regulating base 10 rests thereon. The radially outer surfaces of ridges 85-88 are flush and coplanar with the outer surface 24 of annular wall 12. Annular wall 12 of temperature regulating base 10 defines only four channels 43 for enabling communication of air from the atmosphere 109 to heating space 41. Two of slots 52 are provided closely proximate to and at opposite sides of each of channels 23 for enabling the flexing of teeth 115-118 relative to the teeth 119-122 which do not have channels. As previously inferred, such free flexing of each of teeth 115-118 enables the snap-on characteristic of temperature regulating base 10. Each of teeth 115-118 has an inwardly protruding lip 22 (shown in FIG. 8) along its upper rim 21, but teeth 119-122 do not have lips such as lips 22. Vents (not shown but similar to vents 25 of the first, second and third embodiments) for enabling exhaust of air from transfer space 40 are defined by and between teeth 119-122 and carafe 100.

Recessed spacers 81-84 are spaced at equal arcs about hole 19 which is concentric with the central axis of the temperature regulating base 10. When operatively placed on heating element 90 to regulate the temperature of carafe 100, the particularities of temperature regulating base 10 interact to optimize its operation. Note that this fourth embodiment of temperature regulating base 10, as is true with each of the embodiments of FIGS. 3B-6, may be positioned in the cavity of a heating plate which has a relatively large diameter so that opposite sides of the temperature regulating base 10 can not simultaneously engage the conical portion 95 of the heating plate 90. In such circumstances, air enters heating space 41 not only through channels 23 but possibly from around the entire circumference of temperature regulating base 10. Such may not be desired since the overall temperature regulating characteristics of temperature regulating base 10 are dependant on and are designed through the combinations of the features of temperature regulating base 10. The positioning of ridges 85-88 in the fourth embodiment is such that flow is partially obstructed beneath each of teeth 119-122. Thus, ridges 85-88 not only function as spacers but also ensure the performance of temperature regulating base 10 even when placed in an oversized heating plate cavity.

Each of spacers 81-84 are circular (as is evident in FIG. 7). Holes 130 are provided through the center of each of recessed spacers 81-84 for enabling drainage of water from within transfer space 40 despite the recessed nature of recessed spacers 81-84. Holes 130 are substantially identical to holes 20 but are sealed from communication with heating space 41 when resting on heating plate 90. Recessed spacers 81-84 not only enable the spacing of planar member 11 relative to heating plate 90, thereby enabling formation of heating space 41, but also tend to enhance the durability and ease of manufacturing temperature regulating plate 10. As an alternative to the circularly shaped recessed spacers 81-84, a spacer having an annular shape coaxial with hole 19 may be provided for basically the same purpose. Such an annularly-shaped spacer has radially oriented passageways therethrough for enabling flow of air from the outer portions and into the central portion of heating space 41. In the fourth embodiment of FIG. 7, similar flow of air to the central portion of heating space 41 is enabled between recessed spacers 81-84 and is particularly enabled by the circular nature of recessed spacers 81-84, which circular nature minimizes the flow loss of air flowing around each of recessed spacers 81-84.

During and following the washing of carafe 100 having temperature regulating base 10 mounted thereon, it is advantageous to have any water which has collected within transfer space 40 to be drained therefrom. Such drainage is enabled through the vents 25 (shown in FIG. 3B) when the carafe is positioned upside down such as in a standard draining rack. However, when carafe 100 is placed right side up when there is water within transfer space 40, this water may collect therein, particularly if recesses are provided in planar member 11 such as corresponding to recessed spacers 81-84 in the fourth embodiment. Therefore, holes 130 are provided through the center of each of recessed spacers 81-84.

The particular time-dependant and other characteristics of the temperature regulating functions of temperature regulating base 10 are determined by the combined effects of the various features of the temperature regulating base 10. Those features may thus be altered in number, size, shape or relative configuration, in order to engineer the desired characteristics of the temperature regulation of carafe 100. The features of temperature regulating base 10 which determine the characteristics of the temperature regulation of carafe 100 include the size and shape of spacers such as recessed spacers 81-84 (shown in FIG. 7), the size and spacing of channels such as channels 23, the relative configurations of the holes 20 through planar member 11, the orientation of ridge-like spaces such as ridges 85-88 (shown in FIG. 7), and the relative proximity between channels 23 and vents 25, which relative proximity bears on the percentage of air exhausting through vents 25 which is directly recirculated into channels 23 instead of fresh, cooler air being drawn from atmosphere 109.

Therefore and for other reasons, although the present invention has been described in terms of the foregoing embodiments, this description is provided only as an example and is not intended to be construed as limitation on the invention. The scope of the invention is rather intended to be determined on the basis of the following claims.

What is claimed is:

1. An article for regulating the temperature of a container which is positionable above a heated surface, comprising:
   a first portion for restricting communication of heated fluid from a first space adjacent a heated surface to a second space adjacent a lower surface of a container positioned above said heated surface, said first portion having a plurality of holes therethrough;
   a second portion for defining a fluid passage to enable direct fluid communication between an atmosphere and said first space when said container is at rest above said heated surface, said second portion being integral with said first portion and said atmosphere being cooler than said heated surface; and
   means for mounting said first and second portions to a container in a manner which provides a second fluid passage for enabling direct fluid communication between said second space and said atmosphere, thereby enabling circulatory flow between said second space and said atmosphere.

2. The article of claim 1 wherein:
   said first portion comprises a planar member separating said first space from said second space.

3. The article of claim 2 wherein:
   said first portion has an engaging means formed therewith for engaging said heated surface in a manner which provides said first space between said first portion and said heated surface.

4. The article of claim 3 wherein:
   said engaging means has a hole therethrough for enabling drainage of water from within said second space.

5. The article of claim 2 wherein:
   said first portion has means protruding therefrom for obstructing flow of fluid from said first fluid passage to said first space.

6. The article of claim 1 wherein:
   said second portion is adapted to define said second fluid passage between a surface of said second portion and a surface of said container when said second portion is mounted on said container.

7. The article of claim 1 wherein:
   said second portion is adapted to rest on said heated surface in a manner which defines a portion of said first fluid passage between said heated surface and a surface of said second portion.

8. The article of claim 7 wherein:
   said second portion has spacers formed therewith for engaging said heated surface in a manner which provides said first space between said first portion and said heated surface.

9. The article of claim 8 wherein:
   said second portion has an upper rim; and
   said mounting means comprises a plurality of protrusions formed integrally with said second portion at its upper rim for engaging said container.

10. The article of claim 9 wherein:
    said second portion has axial slots therein for enabling movement of said protrusions relative to other sections of said upper rim to further enable mounting on said container.

11. A container adapted for containing liquid and being heated by being placed above a heated surface, comprising:
    a carafe having a circumferential groove on its outer surface; and
    a temperature regulating base mounted on a lower surface of said carafe, said temperature regulating base comprising:
    a first portion for restricting communication of heated fluid from a space adjacent a heated surface to a second space adjacent the lower surface of said carafe positioned above said heated surface, said first portion having a plurality of holes therethrough;
    a second portion for defining a fluid passage to enable direct fluid communication between an atmosphere and said first space when said carafe is at rest above said heated surface, said second portion being integral with said first portion and having an upper rim, said atmosphere being cooler than said heated surface; and
    means for mounting said second portion to said carafe in a manner which provides a second fluid passage for enabling direct fluid communication between said second space and said atmosphere, thereby enabling circulatory flow between said second space and said atmosphere, said mounting means comprising a plurality of protrusions formed integrally with said second portion at its upper rim for engaging the groove of said carafe, and said second portion further having axial slots therein for enabling movement of said protrusions relative to other sections of said upper rim to further enable mounting on said carafe.

12. The article of claim 11 wherein:
    said second portion is adapted to define said second fluid passage between a surface of said second portion and a surface of said carafe when said second portion is mounted on said carafe.

13. The article of claim 12 wherein:
    said second portion is adapted to rest on said heated surface in a manner which defines a portion of said first fluid passage between said heated surface and a surface of said second portion.

* * * * *